Dec. 13, 1966   G. R. BIRD ETAL   3,291,550
METALLIC GRID LIGHT-POLARIZING DEVICE
Original Filed Jan. 12, 1959   2 Sheets-Sheet 1

INVENTORS
George R. Bird
BY Maxfield Parrish, Jr.
Brown and Mikulka
ATTORNEYS

Dec. 13, 1966  G. R. BIRD ETAL  3,291,550
METALLIC GRID LIGHT-POLARIZING DEVICE
Original Filed Jan. 12, 1959  2 Sheets-Sheet 2

INVENTORS
George R. Bird
BY Maxfield Parrish, Jr.
Broward Mikulka
ATTORNEYS

United States Patent Office

3,291,550
Patented Dec. 13, 1966

3,291,550
METALLIC GRID LIGHT-POLARIZING DEVICE
George R. Bird, Concord, and Maxfield Parrish, Jr., Lexington, Mass., assignors to Polaroid Corporation, Cambridge, Mass., a corporation of Delaware
Continuation of application Ser. No. 165,138, Jan. 9, 1962, which is a division of application Ser. No. 786,414, Jan. 12, 1959, now Patent No. 3,046,839, dated July 31, 1962. This application Apr. 16, 1965, Ser. No. 453,538
5 Claims. (Cl. 350—147)

This invention relates to a method of forming a novel metalized-grid type of light polarizer and to improved light-polarizing products produced by the method.

This application is a continuation of our application Serial No. 165,138, filed January 9, 1962, now abandoned, which, in turn, is a division of our application Serial No. 786,414, filed January 12, 1959, now issued July 31, 1962 as U.S. Patent 3,046,839.

The present invention is primarily concerned with a novel method of forming improved light polarizers having metalized-grid structures which are capable of polarizing light throughout a wide range of wavelengths. Light polarizers of the type contemplated herein are of high efficiency and marked stability and are designed to provide an expanded field of usefulness by reason of these characteristics and because they are operative in regions of the spectrum wherein light polarizers have previously been faulty in some respect or have been inoperative. The range in which light polarizers of the present invention may be employed includes at least the near and the far infrared and the visible regions of the spectrum. The metalized-grid light polarizers described herein are generally characterized by high density (dichroic) ratios. By way of example, density ratios of 15 at 1.2 microns and of approximately 40 at 2.0 microns have been achived. In general, the density ratio of the metalized-grid light polarizer tends to increase as the ratio of wavelength to spacing of the grid elements increases.

A further advantage of the invention resides in the fact that it presents a practical method of providing a light polarizer within or directly upon glass, or even of incorporating the metalized-grid polarizer with an optical element such, for example, as the surface of a lens, a mirror, a prism, or the like. The metalized grid is also adapted to formation upon or within a plastic carrying material.

In accordance with these and other considerations, an object of the invention is to provide a practicable method for forming a metalized grid comprising grid elements of microscopic dimensions and of a suitable form for polarizing incident light with a high degree of efficiency.

Other objects are to provide metalized-grid polarizers which are adapted to function efficiently in the visible, the near and the far infrared, and possibly other regions of the spectrum; to provide a metalized-grid light polarizer by deposition in vacuum of a metal on a properly contoured surface; to provide a method of forming a metalized-grip type of light polarizer, which method can be performed relatively rapidly and inexpensively and which can be controlled for consistent quality of the product; to provide metalized-grid light polarizers having relatively high density ratios for given regions of the spectrum; to provide a metalized-grid light polarizer on or within a glass or a plastic medium; to provide a metalized-grid light polarizer employing materials which have a high degree of absorption for radiation to be polarized and which are resistant to chemical reaction; to provide suitable transparent base or backing materials for carrying the metalized grid; to provide a suitable master element for use in producing, by a forming or printing operation, the metalized-grid polarizers; and to provide effective forming, metallic deposition, etching, resist, plating and transfer procedures for producing the metalized grids.

Other objects of the invention will in part be obvious and will in part appear hereinafter.

The invention accordingly comprises the product possessing the features, properties and the relation of elements which are exemplified in the following detailed disclosure, and the scope of the application of which will be indicated in the claims.

For a fuller understanding of the nature and objects of the invention, reference should be had to the following detailed description taken in connection with the accompanying drawings wherein.

Figure 1:
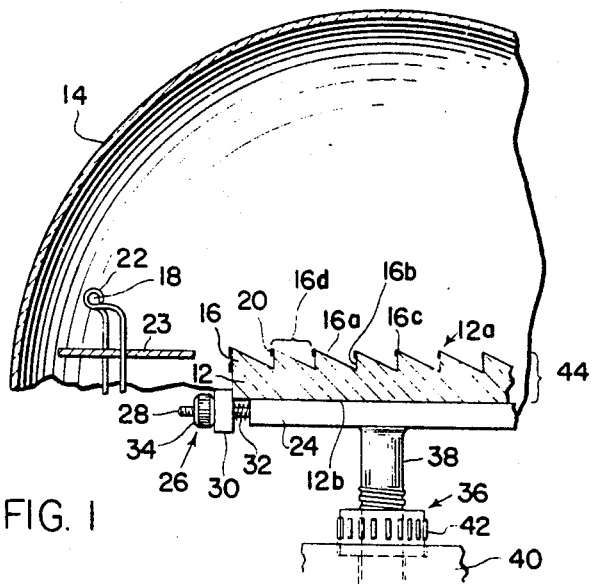
FIGURE 1 is a schematic side view, with elements partly in cross section, illustrating the step of selectively depositing an evaporable metal upon spaced portions of a properly contoured surface during the process of forming the metalized-grid light polarizer of the invention.

The ability of a proper arrangement of spaced metallic wire elements to polarize incident spectra has been known for a considerable perod. An early forbear of a grid type of polarizer was fabricated in 1888 by the eminent German scientist, Heinrich Hertz. This device was made of wires of 0.040" diameter arranged on a large frame for the purpose of polarizing radio waves. Other examples include the optical polarizers of du Bois and Rubens (Annalen der Physik, 1911, vol. 35, Page 243), who wound platinum, copper, gold and silver wires of as little as 0.0010" diameter between spaced frame members, thus forming wire structures capable of polarizing radiation in the far infrared to 24 microns. Further ways of forming an assembly of wires for light-polarization purposes were disclosed by C. H. Brown in 1940–1942 (U.S. Patent Nos. 2,224,214 and 2,287,598).

The methods suggested by the foregoing in forming polarizing bodies generally require the building up of the structure by a cumulative procedure, usually by manipulating a continuous length of extremely thin and fragile wire in a preconceived manner, as, by winding it back and forth between or around spaced frame members or around a drum, together with various supplementary operations. These procedures are of a type which indicate that, at the very least, extreme care must be taken to insure proper spacing between the wires and to prevent their breaking, and the suggested methods would appear to be useful only for the fabrication of relatively small areas in which compartively large wire elements are employed. Furthermore, these earlier suggestions, which necessitate repeating the entire delicate and time-consuming operation for each polarizer produced, are adapted rather to an experimental than to a quantity type of production.

In marked contrast to the above-outlined cumulative practices heretofore employed in forming wire polarizers, a preferred method of the present invention involves the formation of a metalized grid by a metallic deposition or transfer procedure in which a plurality of grid elements are produced simultaneously, or at least in extremely rapid sequence. The process may include the use of a master reproducing element, i.e., a suitable forming or a printing means from which the grid pattern is struck or printed. In certain instances a combination of forming, metallic deposition, and printing procedures may be involved. Whichever of the aforementioned techniques and instrumentalities is employed in the process, grid structures suitable for light-polarization purposes are produced relatively rapidly and uniformly, each complete metalized grid of a given "run" being substantially identical to another. In view of the extremely minute, microscopic areas involved, wherein there may be some 10,000 to 100,000, or more, metalized areas to the inch, the ability to deposit a metal, selectively on these areas, while leaving a like number of intervening light-transmitting areas completely free of the metal, would, perhaps, appear to be impossible. However, the method of the present invention, involving the use of a surface of proper configuration and a controlled angular deposition-in-vacuum of a metal on the selected areas, permits the formation of grid elements of the aforesaid microscopic dimensions and spacing such as to provide efficient light polarizers for at least the visible spectrum as well as for the near infrared and the far infrared.

Referring to FIG. 1, one method of forming a metalized light-polarizing grid of the invention is illustrated. A light-transmitting, generally flat base element 12, composed of glass or a substantially clear plastic material of suitable stability, is mounted in an enclosing tank 14 within which a proper high-vacuum is provided. Element 12 is of a generally planar overall shape and has a configurated front surface 12a composed of a plurality of microscopic, substantially parallel, alternatively grooved and ridged, grid-like portions 16 extending throughout its area and a flat rear surface 12b which may, however, be otherwise contoured. The configurations 16, greatly exaggerated in the illustrations to show their formation, comprise the relatively longer, gently inclined face portions 16a and the relatively shorter, steep face portions 16b. An elongated strip of a metal 18, undergoing vaporization and deposition at grazing incidence, upon face portions 16b to provide metalized face portions 20, is mounted within the coil of an electric heater element 22 at a location to one side of the element 12 so as to extend substantially parallel to the configurations of the element 12. Electrical leads to coil 22 extend through a baffle 23. The base element 12 is mounted for treatment on a platform 24 having, at one end, a laterally adjustable limit stop means 26 to control the lateral position of the element 12 relative to the evaporable metal strip 18. Limit stop means 26 comprises a pair of laterally spaced screws 28, endpiece 30 slidably mounted thereon and biased by compression springs 32 against knurled adjusting nuts 34, one, only, of the screws, springs and adjusting nuts being shown. Platform 24 is also provided with vertically adjustable positioning means 36 comprising threaded post 38 slidably mounted in base 40, with knurled adjusting nut 42 threadedly engaging the post 38. The vertical and horizontal adjusting means serve to adjust the angle of deposition of the evaporable metal and to accommodate configurated carrier elements 12 of various dimensions. It will be understood that heater 22 may be adjustable as to its location for a generally similar purpose.

To provide the required selective metallic deposition on faces 16b, element 12 and evaporable metal 18 are so relatively positioned that the metal can be deposited on faces 16b, only, and not on faces 16a. This is achieved by insuring that the vaporized metal, which travels linearly in the high vacuum existing in tank 14 toward the element 12, is provided with an unobstructed path to at least portions of the faces 16b while it is blocked from impinging upon any of the surfaces 16a. Each high point or ridge 16c of element 12, while providing the surface 16b which is to be coated, also constitutes a blocking means or barrier between the metal undergoing evaporation and the face 16a. Furthermore, high point 16c serves as a barrier which defines the exact area of the next face 16b receiving the metal. Where the vaporization and deposition procedure has been illustrated in FIG. 1 with the configurations of the supporting element 12 facing upwardly, it is to be understood that they may, instead, be mounted to face downwardly and, in fact, the latter constitutes a preferred mounting, as exemplified in FIGS. 6 and 7.

In the example of FIG. 1, it is to be understood that a light polarizer 44 has been formed after completion of the deposition of metal portions 20, these portions, taken with the underlying support, constituting the metalized grid. The term "metalized grid," as employed herein, is intended to denote a plurality of spaced, microscopic, substantially similar areas of a supporting material upon which a thin metallic coating of the character described has been formed. The proper quantity of deposited metal is that which provides substantial opacity of the metalized-grid light polarizer of the invention when it is held in superimposed relation with an analyzer transmitting a beam of light having an electric vector parallel to the grid elements of the light polarizer. It will be observed in FIG. 1 that the metalized grid portions 20 are of a greater area and thickness at the left-hand side of light polarizer 44 nearest the heater 22 than at the right-hand side most remote therefrom. These variations, greatly exaggerated in the illustration, are due to the differences in the angles and in the distances of linear travel of the vaporized metal 18 which occur as the distances of the configurations from the heater 22 vary.

Figure 2:
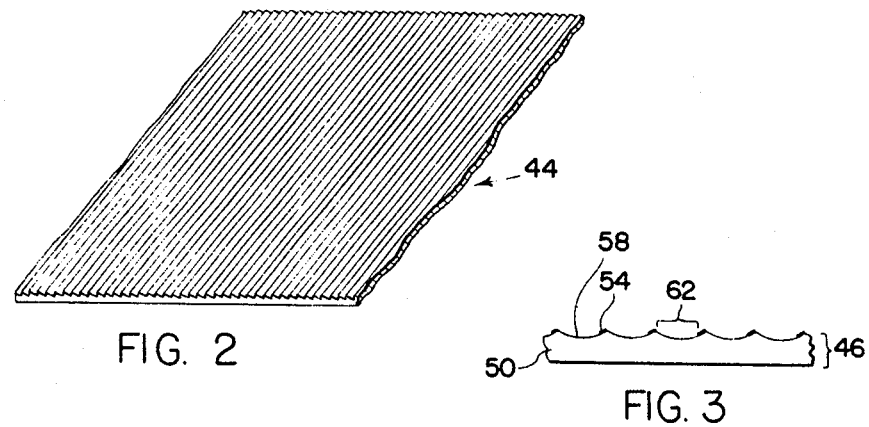
FIG. 2 is a fragmentary, perspective view of a metalized-grid light polarizer of the invention.

It will be understood that, after its completion and removal from tank 14, the light polarizer 44 is positioned, in use, in an optical path extending generally normal to the plane of element 12, said plane being parallel to surface 12b, and that the significant dimension or area of each metal portion 20 is thus that which extends generally parallel to this plane. In view of the required dimensional limitation of the effective areas of the uncoated intervening portions 16a, described below, it is essential that the aforesaid significant area of metallic portion 20 shall be far less than one wavelength of the radiation to be polarized. Means for insuring equality between these areas of the metal deposition throughout the metalized-grid polarizer will be described hereinafter. A microscopic fragmentary section of the light polarizer 44, after its removal from the deposition coating device of FIG. 1, and with configurations still greatly exaggerated, is shown in FIG. 2. In use as a light polarizer, it may generally be assumed that the transmitted component of the incident light vibrates in a direction transversely of the lines of the metalized grid, while the absorbed component vibrates in a direction parallel therewith.

The light polarizer of the invention also reflects a certain amount of incident light and the reflected light is at least partially polarized in a direction other than the polarizing direction of the transmitted light. The degree of polarization of the reflected component depends, in large measure, upon the angle at which the polarizer is mounted relative to an optical path or axis. While the polarizer is primarily of a transmission type it may also have some application as a reflection type of polarizer or as a beam splitter.

The carrier or base 12 of the plurality of metalized grid components 20 may, for practical purposes, be considered to be a plastic replica of an original or master element, previously engraved on a suitable glass or metal blank, although the original, itself, could be employed as the carrier if economy and rapidity of production were not of importance. The master element is formed by a properly shaped ruling diamond, the diamond carriage being driven in a known manner by a ruling engine. Originals having from approximately 10,000 to 120,000 grooves (and an equal number of ridges) to the inch are adapted to the formation therefrom, by a casting operation, of replicas suitable for selective metalization of the character described herein. Alternatively, the configurations may be impressed into a softened area of a light-transmitting carrier material by applying thereto a suitable solvent, heat, etc., and pressing the configurated master element against the softened material. In the latter instance, the master element may either be in the form of a flat embossing plate or it may be of cylindrical shape and mounted on a driven rotatable element, for use in producing a continuous length of the configurated material.

A replica of the type contemplated for use as the support or carrier element of the metalized grid is thus formed of a plastic which has derived its impressions from a ruled original, or from an intermediate replica produced from the original. The plastic material of the replica is adapted to reproduce the minute configurations of the original master, to have the required transmission characteristics, to be sufficiently stable and to have other qualities which may be required such as those of flexibility or rigidity, resistance to radiation and chemical attack, heat resistance, high mechanical strength, abrasion resistance, workability, and the like. A plastic of generally suitable characteristics is poly $CF_2CFCl$ (Kel-F plastic, manufactured by Minnesota Mining & Manufacturing Co., Chemical Products Group, Jersey City, N.J.). This material transmits wavelengths within the range of from 275 m$\mu$ to 7.0$\mu$ and is useful for many ultraviolet, visible, and infrared applications. Polyethylene is another plastic which is particularly suitable where an infrared polarizer is the objective because of its transmission for the 8 to 13.5 micron region of the infrared and by reason of its possessing other of the above-mentioned desirable physical characteristics. Any material which can be treated to acquire the desired configuration, either by casting or by engine ruling, and which possesses physical and other characteristics, such as those above-named, which may be deemed necessary, is satisfactory as a carrier for the metal depositions. The Kel-F plastic can be employed as the replica material, either alone or backed by another transparent material, depending upon the degree of rigidity required. If substantial rigidity is essential, the replica, formed, for example, of Kel-F, of polyethylene, or of another chosen plastic, may be bonded to a suitable backing or base such as a layer of $CaF_2$ which is transparent from 200 m$\mu$ to 9$\mu$.

Where, as above described, selective deposition-in-vacuum of a metal on a configurated grid-like surface or grating is involved in producing the metalized-grid polarizer, it has previously been intimated and may generally be assumed herein that because of the various economic advantages involved, replicas of an original master are employed as support elements of the metalized grids rather than the originals themselves. Exceptions to this assumption may occur where it is desired to use, as a configurated support for the vaporized metal, a substance such as glass, calcium fluoride ($CaF_2$), quartz, or another suitable transparent material, in which instance the configurations may be engraved directly thereon. While considerable latitude as to the thickness of the support is permissible, a relatively thin support probably has the wider utility and is preferable as the carrying element of the metalized-grid polarizer. As an example, supports of polyethylene of up to 0.003" thickness have been found to be highly transparent for polarizers for the 8 to 13.5 micron region of the infrared.

To provide the polarizing function of the supported metalized grid, it is essential that the spacing $16d$, between like surfaces of the successive metalized portions 20, shall be less than one wavelength of the radiation to be polarized, and to insure its invariable operation as a polarizer the spacing should be not more than one-half of the wavelength of the radiation. It is also a requisite that the vaporizable metal employed shall be extremely opaque to the radiation to be polarized. In the infrared, this requirement is met by substantially all metals. In or near the visible spectrum, however, many metals do not have the property of high absorption. Thus, in the latter regions, thin metal films which were opaque for the infrared may be characterized by a disappearance of metallic-type reflection and absorption and by transmission of the light previously absorbed.

Figure 3:
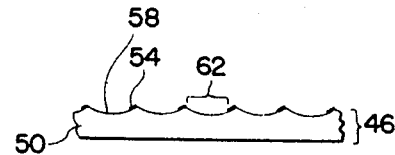
FIGS. 3 and 4 are diagrammatic, fragmentary views of modified metalized-grid light polarizers of the invention.
Figure 4:
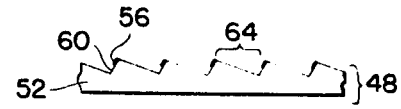

The metalized-grid polarizers 46 of FIG. 3 and 48 of FIG. 4, exemplify modifications of the configurations of the carrier elements. Thus, carrier elements 50 and 52 will be noted as having selective depositions of the metals 54 and 56 on faces 58 and 60, respectively, the latter extending relative to the plane of the carrier elements at angles other than the angle of faces $16b$ of FIG. 1. These face angles of carrier elements 50 and 52 necessitate a somewhat more critical control of the deposition operation to insure that the metallic portions 54 or 56 are held to a proper dimension or area in the aforesaid significant direction parallel to the plane of the respective carrier element, which direction is from left-to-right in the illustration. In these examples it will be apparent that both the angle of deposition and the amount (thickness) of the deposition contribute to the significant lateral dimension of the metal.

In view of the above-described considerations relating to the deposited film or coating of metal, and which are particularly apparent with respect to coated portions of the type of 54 and 56 of FIGS. 3 and 4, respectively, it will be evident that the choice of an evaporable metal having proper characteristics of opacity is important to provide the absorption which is essential. Particularly satisfactory metals for use over a broad band of wavelengths comprising the far and near infrared and the visible, and extending into the ultraviolet region (400–200 m$\mu$) are aluminum and rhodium. The other platinum metals, platinum, palladium and iridium or any metal having sufficient absorption in the desired region may also be employed as the evaporable metal for deposition purposes. However, it is desired not to be limited to these metals and any substance, whether or not classifiable as a metal, which, in a very thin layer, has high reflectance or absorption for the light to be polarized and which is otherwise adapted to use in constructions of the invention can be employed in their stead. Referring again to the high density ratios attainable through the method of the invention, the density ratio of 15 at 1.2 microns and of 40 at 2.0 microns were realized by the selective deposition-in-vacuum of aluminum on a configurated element formed of $(CF_2CFCl)_n$.

This thickness of the deposited metal portions 20, 54 and 56, respectively, is affected by such factors as regulation of filament temperature, time of evaporation, angle of incidence during deposition, proximity to and remoteness from the heater, etc. The considerations leading to differences in area between metalized grid portions, located adjacent and increasingly remote from the vaporizable metal positioned in the heater coil, have been described relative to FIG. 1. It has been noted, particularly with respect to the examples of FIGS. 3 and 4, that both the angle of incidence and the thickness of the metallic deposition are involved in determination of the significant or functional dimensions of the metal areas. While any differences between the selectively metalized areas may not be sufficient to seriously affect the optical performance of the metalized-grid polarizer where the overall area is small, i.e., a square of one inch or less, or where the requirements are not unduly exacting, in other and probably the wider applications, it is essential that all of the metalized grid portions, throughout the light polarizer, shall be held to substantially identical areas. As mentioned, this is particularly true with respect to gently- or gradually-sloped configurations of the types shown in FIGS. 3 and 4 where deviations between the deposition angles and thicknesses of the metal relative to different portions of the configurated surface will have a more pronounced effect on the functional dimensional characteristics of both the metalized portions 54 or 56 and the intervening transmitting areas 62 or 64.

Assuming that production of a light polarizer of appreciable width is being undertaken, an elongated heater mounted to extend parallel with the grooves of the configurated surface, is required to obtain and even transverse deposit of the metal, or several heaters, arranged inline, may be employed for a similar purpose. Evaporating heaters or filaments of various design, within the aforesaid categories, are well known and virtually any of these may be employed with some degree of effectiveness to vaporize the metal used in forming the metalized grid, provided that they constitute a proper line source and are of a type which retains the metal at the hotter portions of the filament during operation. One preferred type of heater is the "oven" heater 66 of FIG. 5, having a directional aperture 68. The metal 70, undergoing evaporation, is confined within the heater and this type of heater is well adapted for continuous operation.

Figure 5:
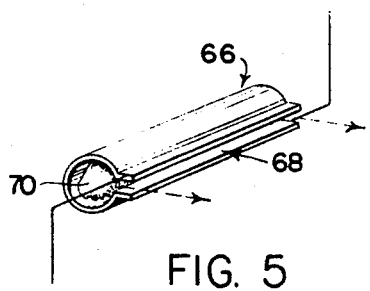
FIG. 5 is a diagrammatic, perspective view of a heater element adapted to use in the process.
Figure 6:
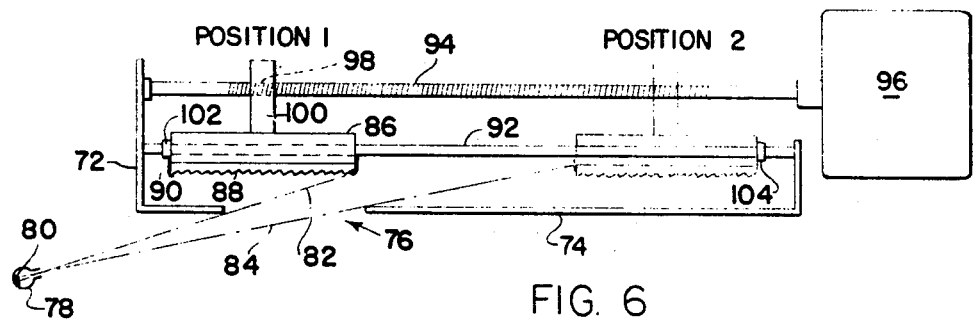
FIGS. 6 and 7 are diagrammatic side views further illustrating the method of forming the metalized-grid light polarizer of the invention.

Various procedures for providing uniformity between the metal depositions on the faces are contemplated. Lateral and vertical adjusting means for providing a proper metallic deposition angle and relating to this purpose have been shown in FIG. 1 and the provision of heater means of an elongated character for obtaining uniformity between the ridge extremities of the polarizer has been mentioned. In FIG. 6 a more precise control of the metalization operation is illustrated which provides metalized-grid elements of uniform area in the aforesaid significant lateral direction (from left-to-right in the figures). The apparatus illustrated, with the probable exception of the driving means, is to be understood as enclosed in a vacuum tank (not shown). Fixed shield or baffle elements 72 and 74 provide an aperture 76 through which the vaporized metal is transmited. A heater 78, of the type shown in FIG. 5, is so mounted as to provide a directional deposition of the evaporable metal 80, i.e., aluminum, rhodium, or other chosen metal, within the area comprised by the extreme rays 82 and 84.

Carrier means 86 for mounting a configurated light-transmitting element 88, as by retaining clips 90, is slidably mounted on a parallel pair of guide rods 92 (one shown). A worm 94, driven by a variable speed, automatically reversible electric motor 96, engages a nut 98 formed in an extension 100 of the carrier. In the illustration, carrier 86, as driven to the left by rotating worm 94 in engagement with nut 98, has just reached its limit of travel in this direction, as determined by contact of the carrier with limit stop 102. At this location, designated "position 1," it will be noted that the trailing edge of element 88 has passed just beyond the area of metallic deposition, bounded by the lines 82 and 84 and determined by the angular location and directional characteristics of the heater in conjunction with the aperture 76, and that no metal is being deposited on the configurated surface of the element. Contact of the carrier 86 and limit stop 102 causes reversible motor 96 to automatically reverse its direction of rotation.

The ensuing reverse rotation of worm 94 causes the carrier 86 and mounted element 88 to be moved to the right to "position 2" at which the element 88 will again have proceeded beyond the area of metallic deposition bounded by broken lines 82 and 84 so that no metal is deposited on its surface. At "position 2," carrier 86 will contact limit stop 104, thereby causing motor 96 to automatically reverse its direction of rotation and to once again provide movement of the carrier and mounted element 88 to the left. Travel of the carrier in but one direction may constitute a metallic deposition cycle or further movement in an opposite direction may be required. The travel of carrier 86 which constitutes a cycle depends upon such factors as the speed of travel, the rate and extent of evaporation, the thickness of coating required, etc. During travel of the configurated element 88 between the positions 1 and 2, it will be understood that the proper grid areas of the configurations are subjected to the vaporized metal and that the metal is deposited only on relatively small face portions of each ridge, while relatively large adjacent ridged or grooved face portions receive no metal due to the controlled angles of deposition and the barrier function of each adjacent ridge. It will also be obvious that baffle or other means (not shown) are employed to prevent metal from being deposited on guides 92 or worm 94. In thus moving the configurated element 88 and controlling the angles of incidence of the vaporized metal deposited thereupon, by means of the heater location, the shields and the aperture, uniformity between the metalized grid portions is achieved.

Figure 7:
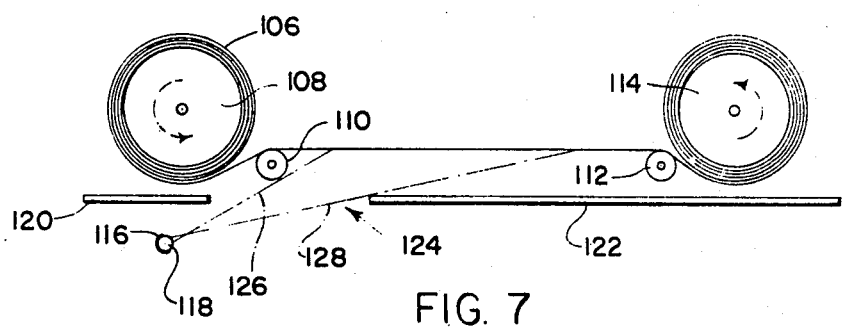

In FIG. 7 a procedure for forming a metalized-grid light polarizer substantially similar to that exemplified by FIG. 6 is illustrated but within the vaporized metal is deposited on the configurated surface of a continuous, flexible film, the configurations being similar to those previously described for metalization purposes. A supply of the film 106 is provided on rotatable reel 108. The film passes across guide rollers 110 and 112, with the configurations facing downward and preferably edge portions only in contact with the rollers, and is taken up on motor-driven takeup reel 114. The evaporable metal 116 from heater 118 is deposited upon selected surfaces of the moving configurations as determined by the shields 120 and 122 and the aperture 124, defining the extreme rays 126 and 128. Other considerations are generally similar to those described relative to FIG. 6.

Several modified procedures may be employed for forming a metallic or metalized grid of the invention. In one example, an original configurated master element, formed of glass or of a metal, or a replica cast from such an original and of the type above-described and represented by elements 12, 50 or 52, devoid of their metallic depositions, is employed as a printing plate or matrix and is coated or wetted with a chemical "ink" such as a reactive substance reducible to a metal, the ridges constituting the printing surfaces. The coating may, for example, be a metallic salt solution such as $AgNO_3$, $PtCl_4$ or $Rh(NO_3)_3$, including, as may be necessary, an additive to provide a viscosity or other property for improving its printing characteristics. The coated plate or matrix is then brought into contact with the flat surface of a light-transmitting blank which is to serve as the carrier or base element for the metalized grid and the solution is deposited thereon in a pattern of minute lines corresponding to the ridges of the printing plate. The carrier element may, appropriately, be composed of glass, a plastic, or a mineral adapted to transmit a wavelength band within which the polarizer is to be employed. After deposition of the printing solution, it is dried and is reduced to a metal through treatment with fumes such as those of $H_2$ or $N_2H_4$. After the metalized grid has been thus formed, the surface carrying the same may be treated with a suitable lacquer or other coating for protective purposes or a thin glass or other transparent element may be bonded thereto for a like purpose.

A second alternate procedure contemplates wetting with an etching substance, such as a HF solution, a proper configurated element of the type above described which serves as an etching means; applying the wetted etching means to a flat surface of a glass carrier element, etching to a given depth as provided by the ridges of the etching means, and then metalizing the unetched high areas by any suitable procedure to provide the metalized grid.

Another modified procedure is that of coating a configurated element of the type above described with a substance repellent to an etching solution, i.e., with a greasy substance; printing the greasy substance on a flat glass element; etching the intervening uncoated portions; removing the grease from coated portions, and metallizing the degreased high areas by any suitable procedure to provide the metalized grid. Alternatively, the intervening uncoated portions may be metalized directly, thus obviating the etching step.

A further alternative procedure contemplates coating a flat surface of an element such as a glass or a plastic blank to be employed as a carrier or base for a metallic grid with a reducible optical substance such as AgCl; and bringing into contact therewith a configured printing element of the type exemplified in FIGS. 1, 3 or 4 having metalized grid portions 20, 54 or 56, respectively, i.e., of aluminum or chromium, deposited thereon. Assuming the metalized portion to be aluminum, the following reaction is that which occurs: $3 \text{ AgCl} + \text{Al} \rightarrow 3 \text{ Ag} + \text{AlCl}_3$.

Another modification of the method is that of evaporating a nonadhesive material, such as a greasy substance, on a configurated replica; evaporating a suitable metal on the grease-coated replica; and pressing the replica against a clean, flat, heated optical surface of the carrying element.

Another alternate procedure comprehends coating the entire configurated surface of an element of the type shown in FIGS. 1–4 with finely divided carbon, i.e., from an acetylene flame low in oxygen; wiping the carbon from upper portions of the ridges only; immersing the element in an electroplating bath to provide plated grooved portions; and applying a protective coating, as required. If desired, the grid may be transferred to another plastic carrier which has undergone suitable preparation, including softening.

A further adaptation of the method contemplates the coating of a preferably resilient plastic replica of the character previously described with waterglass ($Na_2Si_nO_{2n+1}$); and pressing the coated replica against the flat optical surface of a warmed glass element which is to constitute the carrier of the metalized grid. The waterglass adheres to the flat surface to provide a plurality of printed lines corresponding to the ridges of the printing element. After drying, the lines are metalized by any suitable operation. A very fine colloidal suspension of $SiO_2$ in water (30% by weight $SiO_2$) may be employed in place of the waterglass.

The production of metalized-grid polarizers of generally flat or planar overall contour has been described at length herein, but the present invention is also intended to include the possibility of their being in the form of curved elements including those curved in one direction or of a convex or a concave shape. While the procedures described herein are adapted to the production of grid-type light polarizers composed of extremely minute configurations, i.e., including 100,000 or more to the inch, it is to be understood that the width of the grid elements may, if desired for any reason, be further narrowed by stretching the carrier material and formed metalized grid in a direction parallel with that in which the grid elements extend. In the coating operations of the invention it is generally to be assumed that each grid element is formed as a continuous, minute ribbon or band. If, for some reason, it is not so formed and is broken at one or more points, there is no perceptible impairment of the polarizing property of the grid provided that the breaks in the individual grids are separated by several wavelengths of the light undergoing polarization.

Since certain changes maye be made, within the scope of the claims, in the above described product, it is intended that all matter contained in the above description or shown in the accompanying drawings shall be interpreted as illustrative and not in a limiting sense.

What is claimed is:

1. A metallic grid light-polarizing device adapted to polarize incident light in the visible and infrared regions of the spectrum and possessing marked stability and a high density ratio for light in said regions, comprising a generally planar light-transmitting carrier element having a configurated principal surface composed of a plurality of microscopic substantially equally spaced and parallel ridges extending thereacross, a flat nonconfigurated opposite surface, and, adjacent to the crests of the ridges, a plurality of substantially continuous, ribbon-like, metallic strips composed of a vaporized metal deposited thereon of given highly absorptive and reflective properties extending along the entire length but only a portion of the width of a face of said ridges, said metallic strips thus being interspersed throughout their length with clear linear bands of substantially constant width composed of non-metal-bearing portions of the carrier element, the width of one metallic strip and an area intervening between the next metallic strip, as measured in a plane parallel with the plane of said carrier element, not exceeding one-half the wavelength of the light to be polarized and, when taken with the continuity and the opacity of said strips relative to said light, constituting a light polarizer of a transmission type adapted to provide linearly polarized light wherein the vibration direction is normal to the direction in which said strips and intervening bands are disposed.

2. A light polarizing device as defined in claim 1, wherein said metallic strips comprise a deposition of a metal selected from the class of strongly light-reflective and absorptive materials consisting of aluminum, rhodium, platinum, palladium and irridium.

3. A light polarizing device as defined in claim 1, wherein said carrier element is the plastic material $(CF_2CFCl)_n$.

4. A light polarizing device as defined in claim 1, wherein said carrier element is the plastic material polyethylene.

5. A metallic grid light-polarizing device adapted to polarize incident light in the visible and infrared regions of the spectrum and possessing marked stability and a high density ratio for light in said regions, comprising a generally planar light-transmitting carrier element having a configurated principal surface composed of a plurality of microscopic substantially equally spaced and parallel ridges extending thereacross, a flat nonconfigurated opposite surface, and, adjacent to the crests of the ridges, a plurality of substantially continuous, ribbon-like, metallic strips composed of a vaporized metal deposited thereon of given highly absorptive and reflective properties extending along the entire length but only a portion of the width of a face of said ridges, the faces of said ridges bearing said metallic strips being more steeply inclined than the faces which are devoid of said metallic strips, said metallic strips thus being interspersed throughout their length with clear linear bands of substantially constant width composed of non-metal-bearing portions of the carrier element, the width of one metallic strip and an area intervening between the next metallic strip, as measured in a plane parallel with the plane of said carrier element, not exceeding one-half the wavelength of the light to be polarized and, when taken with the continuity and the opacity of said strips relative to said light, constituting a light polarizer of a transmission type adapted to provide linearly polarized light wherein the vibration direction is normal to the direction in which said strips and intervening bands are disposed.

References Cited by the Examiner

UNITED STATES PATENTS

| 2,224,214 | 12/1940 | Brown | 88—65 |
|---|---|---|---|
| 2,714,816 | 8/1955 | Pennell. | |
| 2,815,452 | 12/1957 | Mertz. | |
| 2,874,612 | 2/1959 | Luboshez. | |
| 3,045,532 | 7/1962 | Staunton | 88—1 X |

DAVID H. RUBIN, *Primary Examiner.*